United States Patent [19]  [11] 3,991,252
Kolakowski et al.  [45] Nov. 9, 1976

[54] NOVEL PRODUCT AND PROCESS

[75] Inventors: Richard A. Kolakowski, Northford; Harold E. Reymore, Jr., Wallingford; Richard H. Roess, Clinton, all of Conn.

[73] Assignee: The Upjohn Company, Kalamazoo, Mich.

[22] Filed: Apr. 29, 1975

[21] Appl. No.: 572,719

[52] U.S. Cl. .............................. 428/313; 156/71; 427/244; 427/403; 427/407 R; 428/314; 428/315; 428/424; 428/538; 428/921
[51] Int. Cl.² .................................................. B32B 3/26
[58] Field of Search .......... 428/310, 313, 315, 314, 428/538, 424, 920, 921; 156/71; 427/403, 244, 407

[56] References Cited
UNITED STATES PATENTS

| 3,192,098 | 6/1965 | Phillips | 428/310 |
| 3,295,278 | 1/1967 | Muhm | 428/310 |
| 3,401,069 | 9/1968 | Lorentzen | 156/71 |

FOREIGN PATENTS OR APPLICATIONS

| 925,198 | 5/1963 | United Kingdom | 428/310 |
| 1,003,611 | 9/1965 | United Kingdom | 428/310 |
| 1,030,333 | 5/1966 | United Kingdom | 428/310 |

Primary Examiner—William J. Van Balen
Attorney, Agent, or Firm—James S. Rose; Denis A. Firth

[57] ABSTRACT

Novel fire resistant insulating structural building elements are provided which are comprised of unitized structures such as walls, roofs, ceilings, and floors in combination with a layer of plastic foam insulation to which is in turn bonded a coating of gypsum plaster by a layer of bonding agent. The novel elements of the invention find particular utility in the rapid and economic construction of thermally insulated and fire resistant buildings. Additionally, a method is disclosed for a facile and economic way of providing thermal barrier protection for exposed plastic foam insulation in existing buildings by the application of a bonding agent and a plaster coat on said foam.

23 Claims, 7 Drawing Figures

3,991,252

NOVEL PRODUCT AND PROCESS

BACKGROUND OF THE INVENTION

1. Field of the Invention

This invention relates to fire and heat resistant structural building elements and methods for their preparation.

2. Description of the Prior Art

Fire retardant building panels which employ a combination of gypsum or gypsum based plaster and a foamed plastic are well known. For example see, U.S. Pat. Nos. 3,295,278 and 3,462,399. Gypsum plaster formulations suitable for spray application are also well recognized in the building art, some including a bonding agent incorporated in the plaster mix, see U.S Pat. No. 3,819,388. A number of industrial bulletins disclose various types of fire retardant coating materials which are suitable for application directly to foamed plastics. Pertinent bulletins are listed herein: Amspec. Inc., 1880 MacKenzie Drive, Columbus, Ohio, Building Insulation Bulletin, September 1973, p. 5, discloses the application of gypsum plaster on polyurethane foam or styrofoam; CPR Division, The Upjohn company, 555 Alaska Ave., Torrance, Calif., Urethane Building Insulation Bulletin, June 1973 discloses the application of gypsum plaster upon urethane or isocyanurate foam; Tufcon Inc., 17000 S. Western Ave., P. O. Box 149, Gardena, Calif., Specification TUR-304 discloses the application of a portland cement based formulation in three separate coats on polyurethane foam which has been coated with a bonding material; Foamseal Inc., 2425 N. Lapeer Road, Oxford, Mich., Test Report, May 1974 discloses the application of Pyrocrete X 4800-11 which is a magnesium oxychloride cement, on polyurethane foam; Albi Manufacturing Corp., 98 East Main St., Rockville, Conn., Albi Product Data Sheet on Duraspray recommends the application of this magnesium oxygen chloride cement to exposed plastic foam insulation; and E. H. O'Neill Floors Company, Cicero, Ill., in Fire Ban for Insulation, disclose the use of the magnesium oxychloride composition Fire-Band over polyurethane insulation board.

However, the art has recognized that the application of such cementitious coatings directly to foamed insulation, without the use of some type of lath or wall tie, leads to adhesion problems, particularly in overhead applications. Also, as in the case of portland cement plaster, it must be applied in a number of thin coats to make up the desired thickness. The prior art coatings which contain magnesium oxychloride cannot be used without sealing coats in banana rooms, packing house chill rooms, meat sales coolers, and the like due to the hazard of corrosive materials which can arise from such coatings. See Fire Ban for Insulation, page 3, July 1961, E. H. O'Neill, Cicero, Ill.

It has now been found, unexpectedly, that gypsum plaster can be applied as a single coat of desired thickness to a plastic insulating foam layer which has received a coating of a bonding agent, to provide a strong and very useful structural building combination. Further, it has been found that the aforesaid elements in combination with various types of wall, ceiling, and floor members provide structural elements which possess excellent thermal insulation and fire resistant properties. In yet a further novel aspect of the present invention, it has been found that existing structural elements such as walls, roofs, etc. which may present a fire hazard due to exposed plastic foam thereon, can now be facilely and economically provided with a thermal barrier of the present invention thereby decreasing the hazard.

SUMMARY OF THE INVENTION

The invention comprises a fire resistant insulating structural element which comprises:
a. a substrate member;
b. plastic foam layer one side of which is in adherent contact and coextensive with said substrate member;
c. a layer of bonding agent disposed on the opposing side of said foam layer; and
d. a face layer on said element which comprises a layer of gypsum plaster in adherent contact with said bonding agent and coextensive with said opposing side of said foam layer.

The invention also comprises a process for the preparation of fire resistant insulating structural elements.

The invention also comprises a process for providing a thermal barrier for existing structural elements which have exposed plastic foam thereon.

The term "structural element" means a building structure such as a wall, a roof or ceiling, a floor, and combinations thereof.

The term "substrate member" means a structural material of construction such as sheet metal, corrugated sheet metal, wood, cinder block, concrete block, concrete, stone or brick, plasterboard, and combinations thereof.

The term "insulating" means the ability to act as a thermal barrier as measured by the thermal insulation K factor in accordance with ASTM Test C-518.

BRIEF DESCRIPTION OF THE DRAWINGS

FIG. 4b is a cross-sectional plan view of a variation of the embodiment exemplified in FIG. 4a.

DETAILED DESCRIPTION OF THE INVENTION

Figure 1:
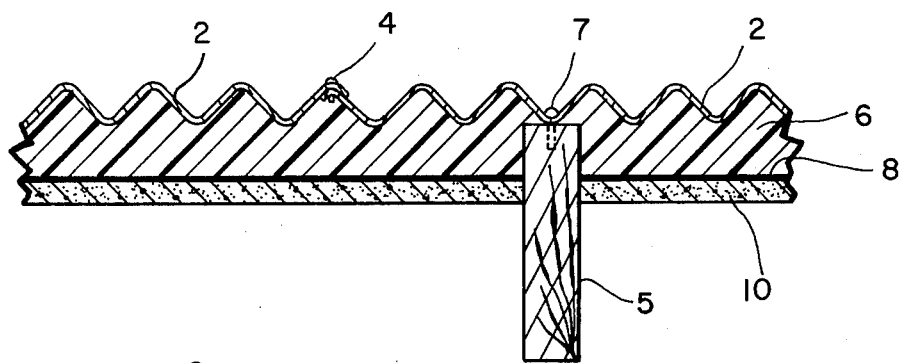
FIG. 1 is a cross-sectional plan view of a partial section of a typical wall element according to the present invention.

It is an object of the present invention to provide novel fire resistant and thermal insulating unitized structural building elements. The building elements of the invention are comprised of materials of construction well known to the art. The novelty of the present invention resides in the particular combination of a substrate member which includes a structural material that can form a wall, a roof, a ceiling, or a floor, which is coated on its interior side (the underside in the case of a floor) with a layer of plastic foam insulation which in turn has a layer of bonding agent on its surface, and then a layer of gypsum plaster in adherent contact with the bonding agent which forms a face layer. In a particularly novel aspect of the present invention, the plaster forms a tenacious bond with the foam insulation which obviates the need for any type of lath or wall tie. Accordingly, the strength of the bond is more than sufficient to allow the use of the structural elements of the present invention on roof or ceiling structures, and floor structures which have the plaster face of the combination facing downwardly.

An advantage to flow from the embodiments of the present invention is the absence of any openings or seams which are characteristic of fire resistant insulating panels of the prior art. In a further advantage to flow from the present invention, surface irregularities, corners, abutments, sections where wall meets roof or ceiling, etc. present no problems, as continuity in insulation and fire resistance is ensured across any such discontinuities, if so desired.

It is a further object of the present invention to provide a method for the preparation of the novel fire resistant and thermal insulating structural building elements. The process combines steps well known in the building art which include the application of the foam forming material on the interior side of the substrate wall, roof or ceiling, or underside of a floor. After the foam has formed, it is coated with a bonding agent, and finally the gypsum plaster is applied to form the interior face of the combination. The process is marked by simple, rapid, and economical steps and will be discussed in detail hereinbelow.

It is yet a further object of the present invention to provide a very simple but elegant thermal barrier protection for existing wall, ceiling, or floor structures which already have exposed plastic foam insulation thereon. Thereby, it is possible to lessen the fire hazard from such existing structures. The process calls for the identical steps outlined hereinabove for the application of a bonding agent on the foam followed by the application of a layer of gypsum plaster on the bonding agent.

The substrate member of the structural element of the present invention as defined hereinbefore refers to a structural material which forms a wall, a roof, ceiling, or a floor. Illustratively, it includes cement, cinder block, cement block, wood including all types of wood used for siding, roofing, and flooring, galvanized and corrugated sheet metal building panels, stone or brick, sheetrock, plasterboard, and the like. There is no criticality in the thickness of the member with the proviso that it possess enough inherent strength in order to hold the weight of the combination of the invention. The thickness will vary from the thickness of standard sheet metal building panel of about 0.02 inch to the thickness of cinder block of about 12 inches or even thicker. The preferred structural materials consist of wood, and all forms of sheet metal building panels.

No special preparation of the substrate material is required other than the normal attention paid to cleanliness, such as the removal of loose paint, dust, dirt, grease, debris, et., and in the case of sheet metal building panels, the usual application of a metal primer paint which most manufacturers apply to the panels during their manufacture.

It will be understood by those skilled in the art that when the substrate member forms an exterior wall or roof, its interior face is the one on which the other components must be applied to form the structural element of the invention. Alternatively the wall member can be inside wall such as a partition wall, a wall of a cold storage chamber which is within a building etc. in which case the terms interior, and exterior would not carry the same significance as hereinabove referred to and the plastic foam, bonding agent, and plaster are then applied on whichever side of the wall is necessary or convenient.

It will be readily apparent to those skilled in the art that an embodiment of the invention which pertains to a fire resistant insulating structural element consisting of a roof is referring to an exterior roof wherein the plaster face of the combination is facing inwardly. A ceiling element of the invention is referring to that embodiment wherein the fire resistant, insulating element is an interior ceiling which has the plaster facing downwardly. It will be further recognized by those skilled in the art that when the substrate member is a floor, the combination of the insulating foam, bonding agent, and plaster are beneath the floor surface.

It is to be understood that a substrate member is not necessarily a single entity. For example in the case of an interior wall wherein the substrate member is a sheet rock wall, it will in turn be attached to a studded wall.

Further, it is to be understood that the surface member of the present invention can have a planar surface, or a non-planar surface, or combinations of both kinds. An example of a planar surface is the normal running length of a flat surface projection as formed by normal flat sheet metal siding, roofing, wood siding, and the like. Typical examples of non-planar surfaces are to be found in the large number of corrugated sheet metal building panels supplied by various manufacturers — each one characterized by its own contoured surface. Other types of surface are illustrated by the irregular contours formed where walls abut roofs or ceilings; or where walls meet steel I beams, wooden studs, girts, etc.; where roofs meet rafters, purlins, etc.; or where floors meet joists, etc. In one embodiment of the present invention, the foam insulation, bonding agent and plaster thermal barrier combination are deposited on the planar surface of the wall, roof, etc., up to the beams, girts, rafters, etc., where they form a tight seal. In another embodiment, the combination can be carried continuously from the planar surface over the non-planar surface without interruption. Accordingly, an uninterrupted layer of fire resistant insulating material completely covers walls, beams, studs, roof, girts, rafters, etc.

The plastic foam layer is applied, preferably by spray techniques, as a pore forming fluid mix directly on to the surface member so as to essentially cover the desired area. After the pore forming mass has risen to form a foraminous layer it cures and is in adhesive contact with the surface member. The foraminous layer can be any of the plastic foam insulating materials known in the art (see Saunders and Frisch, Plastic Foams, Part I and II, 1973, Marcel Dekker, Inc., New York). Illustrative of such materials are foamed polystyrene, polyethylene, rigid polyurethane, rigid polyisocyanurate, and the like. A preferred group consists of rigid polyurethane and rigid polyisocyanurate. The foam can be open or closed cell, however, a closed cell material is preferred as it imparts the greater degree of insulation to the structural element.

Methods for the preparation of the above types of polyurethane and polyisocyanurate foams are well known in the art and do not need detailed description herein; see, for example, Kirk-Othmer, Encyclopedia of Chemical Technology, 2nd Edition, Vol. 9, pages 847–884, and Saunders and Frisch, Polyurethanes; Chemistry and Technology, Vol. XVI, Part II, Interscience 1964, pages 231–233. Various fillers can be incorporated into said foams either to improve strength, or to improve thermal insulation or merely to lower costs of producing the foams. Illustrative of such fillers are cork, expanded perlite, vermiculite, expanded glass, fiber glass, mineral wool, aluminum flake, silica, asbestos and the like.

The density of the rigid cellular polymer foam employed in the thermal insulating barriers of the invention is advantageously from about 1.5 pcf to about 8 pcf and preferably is from about 2 pcf to about 6 pcf.

The plastic foam thickness is not critical to the practice of the invention aside from it being sufficiently thick to impart insulating properties to the structural element. Of course, economic considerations will limit the use of unnecessarily thick sections of foam. The thickness can vary from about ½ inch to about 8 inches and preferably from about 1 inch to about 4 inches.

When the structural elements of the invention are preformed in sections to be installed later, then the foam is dispensed from a foam mixing head (see Saunders and Frisch, Polyurethanes, Chemistry and Technology, Part II, 226–233, 1964, Interscience, New York) on to the horizontally jigged wall, or roof element and the like, to be followed by the bonding agent and gypsum plaster. In the particularly preferred method of application the foam is applied on-site during the building construction using spray techniques well known in the art. See for example, Saunders and Frisch, Polyurethanes, Chemistry and Technology, Part II, 231–233, 1964, Interscience Publishers, New York. The spray application methods well known to those skilled in the art permit the direct application of the foam forming mix to vertical walls, overhead roofs, ceilings, or the underside of floors.

The bonding agent which is applied directly to the surface of the plastic foam can be any of the swellable type bonding agents such as, caesin, ethylhydroxyethylcellulose, polyvinyl alcohol, aqueous emulsions of polyvinylacetate, aqueous urea resin solutions in combination with polyvinylacetate, and like synthetic adhesives. A particularly preferred bonding agent is an aqueous emulsion of polyvinylacetate, such as Sta-Dri Link, manufactured by American Sta-Dri Company, Brentwood, Md., or Weld-O-Bond, manufactured by Silibond Products, Inc., Wilmington, Mass.

The bonding agents, when in the form of aqueous emulsions, are applied at such a rate that 1 gallon advantageously will cover from about 200 to about 500 square feet, and preferably will cover from about 300 to about 400 square feet. The rate of application of the bonding agent in terms of pounds of active ingredient per 100 square feet of plastic foam is advantageously from about 0.8 pound to about 2.0 pounds, and preferably from about 1.0 pound to about 1.5 pounds.

The bonding agent can be applied to the foam surface as soon as the foam has risen and set and has dissipated the major amount of its exotherm heat which is generated during its rise. The bonding agent is preferably applied in the form of an aqueous emulsion by brushing, rolling, of spraying. The latter mode of application is the preferred one wherein ordinary paint spray equipment well known to those skilled in the art is employed. The percent solids content is not critical and can vary for example, from about 30 to about 80 percent and preferably from about 40 to about 60 percent. While it is not absolutely essential that the total foam surface be covered by the bonding agent, optimum adhesion of the subsequent plaster layer is obtained when the coverage is substantially complete. The art discloses gypsum plaster formulations with a bonding agent dispersed therein (U.S. Pat. No. 3,819,388). However, the present invention provides for surprisingly higher adhesion of the plaster layer to the foam when the bonding agent forms a separate layer between the two, rather than when it is dispersed in the plaster, as taught by the prior art.

In the preferred embodiment wherein the bonding agent is an aqueous emulsion of polyvinylacetate, the time which elapses from its application to the time when the plaster coat is applied is not critical. Although, the best results are obtained when the bonding agent is not too moist nor allowed to dry out completely. Advantageously the bonding agent coat is allowed to set for a period from about ½ hour to about 2 days and preferably from about 1 hour to about 1 day.

The gypsum plaster can be any of the standard gypsum plaster formulations well known to the plastering art which include the use of aggregate materials. See, U.S. Gypsum Bulletin, USG Gypsum Plasters, SA 918, 1974. It is well known to those skilled in the art that calcined gypsum is formulated with particular additives such as retarding agents, etc. to suit the mode of application, such as by hand, or machine application. The present invention in its broadest scope includes the application of the gypsum plaster by any method of application but the preferred method is by machine spray application which is a common technique in the art. Therefore the formulations discussed hereinbelow refer to the calcined gypsum supplied particularly for machine application but it should not be construed that the processes of the present invention are so limited.

A typical gypsum neat plaster for machine application complies with ASTM Specification C-28. It is mixed with an aggregate material such as sand, or a light weight aggregate such as vermiculite, or perlite. A particularly preferred aggregate is perlite which is a ground siliceous rock which complies with ASTM Specification C-35. The perlite is combined with the gypsum in a ratio of about 2 cubic feet of perlite per 100 pound bag of commercial plaster to about 4 cubic feet of perlite per 100 pound bag of plaster. Preferably the mix is about 3 cubic feet of perlite per 100 pounds of plaster. The use of a commercially available accelerator is generally necessary when commercial machine gypsum (which contains a retardant) is mixed with perlite which does not accelerate the set of plaster. Therefore an accelerator such as powdered gypsum, aluminum sulfate, potassium sulfate, and the like is added in sufficient quantity to give a set time for the plaster of about 3 to about 4 hours.

In an optional but preferred embodiment, fiber reinforcing material is added to the plaster formulation. The length of the fibrous material is not critical but is advantageously from about ⅛ inch to about 1 inch in length and preferably from about ¼ inch to about ½ inch. Illustrative of such reinforcing agents are, paper fibers, asbestos fibers, rock wool, fiber glass, and the like. A preferred reinforcing agent is chopped strand fiber glass. The amount of fiber glass used is advantageously from about 1 pound to about 10 pounds per 100 lbs. of gypsum and preferably about 2 pounds to about 6 pounds per 100 lbs. of gypsum.

Water is added to the plaster in sufficient quantity to give a slump factor of 6–7 inches as measured in a standard 12 inch slump cone. This provides a measure of the proper consistency for the plaster mix which will result in optimum processing, adhesion strength, and cure properties. The test is very simply performed by pouring the plaster mix into an opening in the top of a 12 inch high cone, removing the cone and measuring the total slump of the plaster. This test is set forth in detail in Gypsum Association AIA File No. 21-A-Z. Other additives, if desired, can be added to the formulation for example, air entrainment aids such as sodium lauryl sulfate, or Tergitol 155s9 (see U.S. Pat. No. 3,819,388, and the like.

The plaster is applied on to the bonding agent so as to essentially cover the wall, or roof, or ceiling, etc. The plaster is applied by spray techniques well known to those skilled in the art. Particularly suitable spray machinery is that type referred to as a plaster finishing machine. Typical models are the Essick FM-9 (supplied by Essick Manufacturing Co., Elizabeth, N.J.) and the Glover DC-8 Dumpover (supplied by Glover Manufacturing Co., Van Nuys, Calif.).

The thickness of the plaster face layer is advantageously from about ⅛ to about 1 inch and is preferably from about ¼ to about ½ inch thick.

The facing of the plaster provides the excellent fire resistant barrier coat on the structural elements of the present invention. The gypsum in the hydrated form has the molecular formula Ca $SO_4.2H_2O$). When exposed to fire the plaster releases its two molecules of water in the form of water vapor which maintains the element temperature at about 212° F until all of the water has been exhausted. The perlite aggregate provides assistance to the overall fire resistance in two distinct ways. Its insulating action delays steam release which retards the transmission of heat. And due to its low linear expansion it greatly reduces the chance of cracks forming in the plaster which form openings through which heat and flame can penetrate into the plastic foam layer.

The embodiments and procedures hereinabove set forth in detail have been directed to teaching the construction of the entire heat and fire resistant structural elements of the present invention. Additionally, the identical steps of covering a plastic foam with a bonding agent followed by the plaster face layer are used to provide thermal barrier protection for an existing structure which has exposed plastic foam thereon. The exposed foam can be on any of the structural elements hereinbefore described. Further, the present invention of protecting existing exposed plastic foam contemplates the foam not only in the form of insulation but additionally when the foam is present in a non-functional capacity such as decorative adornment of ceilings, walls, fixtures, and the like.

The following Table I sets forth a comparison of properties for a gypsum plaster faced element of the present invention and a portland cement plaster faced element according to the prior art. Samples were prepared by spraying a layer of polyurethane foam on to ⅛ inch thick sections of asbestos board so that each piece had a layer of foam about 1 inch thick. The sample prepared in accordance with the invention had its foam surface sprayed at the rate of 300 ft.² per gallon with an aqueous emulsion of polyvinylacetate bonding agent which contained approximately 4 pounds of polyvinylacetate polymer per gallon of the aqueous emulsion or approximately 50 percent by weight. This was followed by a single coat of gypsum plaster prepared at a ratio of 3 cu. ft. of perlite aggregate to 100 lbs. of gypsum plaster for machine application. The plaster also contained 3 ½ lbs. of ¼ inch chopped fiber glass per 100 lb. bag of plaster. The thickness of the gypsum plaster coating varied according to the values set forth in Table I.

The comparison sample was coated on the foam surface with a vinyl acrylic bonding agent (National Starch Co., No. 25-2345) followed by the application of two coats of portland cement plaster according to the specifications of the manufacturer (Tufcon Inc., Gardena, Calif., Specification No. TUR-304). The thickness of the portland cement plaster varied according to the values set forth in Table I.

TABLE I

Comparison of Gypsum Plaster Element vs. Portland Cement Element

| | Portland Cement (thickness in inches) | Gypsum Plaster (thickness in inches) |
|---|---|---|
| Average face density | 37 pcf | 64 pcf |
| Adhesion (tensile str. to remove face layer from foam) | 6.9 psi (1/2") | 16 psi (3/8") |
| Hot Box* | Fail (1/2") | Pass (1/2") |
| Mini-corner** | Fair (8/10") | Good (3/8") |

*Hot Box: measures the time required for a plaster-foam interface to reach 300° F when the plaster side is exposed to an ASTM E 119 heating curve of ambient to 1200° F/15 minutes. To pass the test the temperature must not reach the stated values in less than 15 minutes.
**Mini-Corner: samples are arranged to form a corner 2' high with walls and ceiling measuring 4' × 4'. A propane gas torch is lighted and placed at the junction of the corner. The resulting flame spread (inches), temperature (° C), and damage (% of material) is measured and an overall assessment made.
Pass = flame spread < 32"
Possible = 32" – 40"
Fail = > 40"

The data clearly demonstrates the superior adhesion of the gypsum plaster layer of the present invention in comparison to the portland cement nothwithstanding the higher density of the plaster. The portland cement faced element failed the Hot Box test compared to the gypsum plaster faced element, which also showed a good rating in the Mini-corner test compared to only a fair rating for the portland cement.

The polyvinylacetate bonding agent layer is surprisingly resistant to thermal shock as shown in tests wherein a gypsum plaster faced element as described hereinabove was subjected to high temperature testing. At plaster - foam interface temperatures of 225°–275° F, adhesion loss was directly attributable to polyurethane foam distortion. The bonding agent layer showed no signs of initial failure until the much higher interface temperature of 550° F was reached.

The following Table II sets forth a comparison of properties between two gypsum plaster faced elements of the present invention. One was prepared in accordance with the element described hereinbefore at a ratio of 3 cu. ft. of perlite aggregate to 100 lbs. of gypsum plaster. While the other was prepared with 4 cu. ft. of perlite to 100 lbs. of gypsum. The latter was prepared with a ½ inch thick plaster face and the former prepared with a ⅜ inch thick plaster face.

TABLE II

Comparison of Properties of Gypsum Plaster Faced Elements

| Property | Mix Ratio | |
|---|---|---|
| | 4:1 (½" thick) | 3:1 (⅜" thick) |
| Plaster Face: | | |
| Density (pcf) | 53–55 | 62–65 |
| Compressive str. (psi) | 390 | 610 |
| Compressive Modulus (psi) | 26,980 | 48,310 |
| Flexural str. (psi) | 150 | 210 |
| Flexural Modulus (psi) | 53,870 | 92,700 |
| Overall Element: | | |
| Hot Box*: | Pass | Pass |
| Interface temp.(° F) | 200 | 195 |
| Time(mins.) | 15 | 15 |
| Plaster Thickness | ¾" | ½" |
| Mini-Corner*: | Good | Good |
| % Damage: | | |
| Left wall | 8.2 | 10.7 |
| Right wall | 6.6 | 7.1 |
| Ceiling (based on 4'×4' area) | 9.3 | 4.6 |
| Smoke amount | slight | slight |
| Flame spread max. | 33 in./12 min. | 36 in./14 min. |
| Adhesion (psi): | | |
| Ambient initial | | 18.8 |
| 150° F Dry age, 7 days | | 7.5 |
| 14 days | | 11.6 |
| 200° F Dry age, 7 days | | 20.6 |
| 14 days | | 9.8 |
| Ambient, 100% R.H. 7 days | | 18.5 |
| 14 days | | 14.5 |
| 158° F, 100% R.H. 7 days | | 21.3 |
| 14 days | | 22.5 |

*Test described in footnotes to Table I

The highly unexpected and advantageous results of superior adhesion at the plaster - foam interfaces obtained by the present invention, compared to the prior art methods is dramatically set forth in Table III. The prior art in respect of the application of gypsum plaster on polyurethane foam and other kinds of plastic foam insulation has been referred to hereinbefore. Additionally, liquid polyvinylacetate is added to cementitious coatings to achieve greater adhesion to the substrate (see U.S. Pat. No. 3,819,388 column 2, lines 27–29). Table III sets forth a comparison of the adhesive pressure (in pounds per square inch) required to separate the plaster faces from their respective layers of polyurethane foam in a number of gypsum plaster faced elements. The elements were prepared according to the method set forth hereinabove for 3 cu. ft. of perlite aggregate to 100 lbs. of gypsum plaster and sprayed to an approximate plaster thickness of ⅜ inch on 1 inch thick sections of polyurethane foam which, in turn, was on ⅛ inch thick sections of asbestos board. Element A was devoid of bonding agent in any form, while Elements B, C, and D contained the aqueous emulsion of polyvinylacetate bonding agent (referred to hereinabove and contained approximately 4 pounds of polyvinylacetate polymer per gallon of the emulsion) at levels of once, twice, and four times the amount typically employed according to the present invention but mixed in the plaster in accordance with the prior art. Element E was prepared in accordance with the present invention with the bonding agent applied at the typical amount as a separate layer between the foam and plaster. The batch mix for each element based on 100 lbs. of gypsum covered approximately 62.5 ft.$^2$ of plastic foam per batch when sprayed at ⅜ inch plaster thickness. Therefore the 62.5 ft.$^2$ called for 0.21 gal. of the aqueous emulsion of the bonding agent to be equivalent to a coverage of 300 ft.$^2$ per gallon.

TABLE III

Comparison of Bond Strengths Between Gypsum Plaster - Polyurethane Foam Interfaces

| | A | B | C | D | E |
|---|---|---|---|---|---|
| Bonding Agent: | | | | | |
| Gallons/Method of use | None | 0.21 in plaster | 0.42 in plaster | 0.84 in plaster | 0.21 sprayed on foam |
| Lbs. of polyvinylacetate/100 ft.$^2$ | 0 | 1.34 | 2.7 | 5.4 | 1.34 |
| Adhesion (psi) | 2.8 | 4.2 | 4.4 | 3.8 | 26.2 |

The dramatic difference in the adhesion in the Element E prepared in accordance with the present invention and the other Elements prepared according to prior art methods is clearly set forth in this data.

The structural elements of the present invention are particularly useful for rapid and economic construction of insulated and fire resistant, sheds, garages, power stations, machine shops, large assembly-line factories, and the like. Additionally, the method of providing thermal barriers of the present invention are especially useful in structures of the types listed hereinabove which have exposed foam insulation on the walls, roofs, and ceilings. The exposed foam surfaces are rapidly and economically protected so that the fire hazard is considerably lessened.

The fire resistant insulating structural elements of the invention will now be described in more detail with particular reference to the drawings.

FIG. 1 shows a cross-sectional plan view of a partial section of a wall element according to the present invention. The exterior wall or substrate member consists of corrugated steel building panels 2 joined one to another by bolt means 4 and the panels 2 secured to the wooden support studs 5 by bolt means 7. The plastic foam insulation layer 6 is in adherent contact with the panels 2. The bonding agent layer 8 lies between, and securely bonds together, the foam layer 6 and the face layer of gypsum plaster 10 — all three 6, 8, and 10 abut, and are in sealing relationship to the stud 5. It is readily apparent that FIG. 1 could also represent a partial section of a roof element according to the present invention, if the cross-sectional view was looking along the plane of the roof line in the direction of the rafters and 5 represented a rafter.

Figure 2:
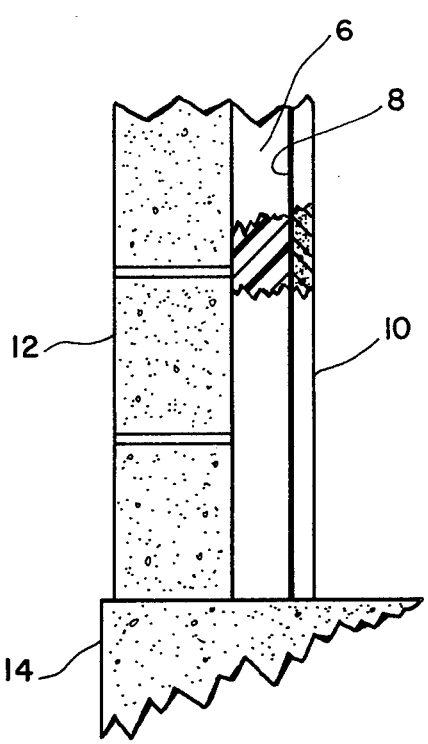
FIG. 2 is a cross-sectional view along the vertical axis of a partial section of a wall element of the invention.

FIG. 2 shows a cross-sectional view of part of a cinder block 12 wall on a concrete slab construction 14. The foam insulation 6, bonding agent 8, and plaster face 10 along with substrate member 12 form a unitized type of structural element.

Figure 3:
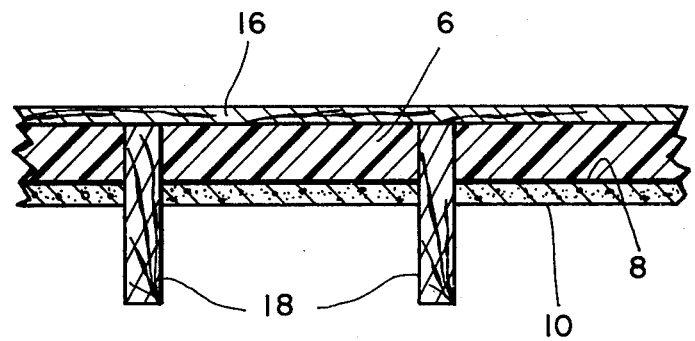
FIG. 3 is a cross-sectional view along the horizontal axis and in the longitudinal direction of the joists of part of a floor section of the invention.

FIG. 3 shows part of a floor section in cross-section along the longitudinal axis of the joists. The wooden flooring 16 rests on joists 18. The wooden flooring 16 forms the substrate member for the layer of foam 6, bonding agent 8, and gypsum plaster 10, all in adherent contact with said member 16 and in sealing relationship with the joists 18.

Figure 4A:
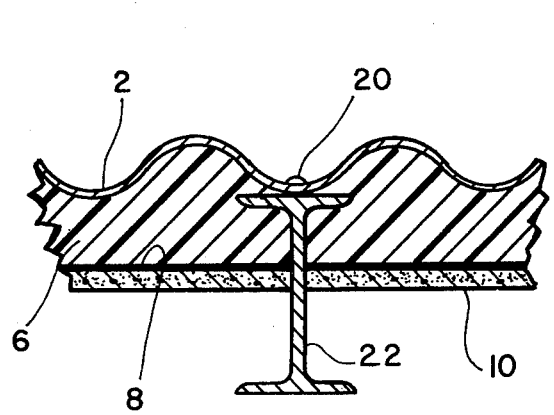
FIG. 4a is a cross-sectional plan view of a partial section of a wall element of the invention.

FIG. 4a shows a cross-section of a plan view of part of a wall according to the present invention. The external wall is corrugated steel paneling 2 joined to a structural steel I beam 22 by bolt means 20. The foam 6, bonding agent 8, and gypsum face 10 are in adherent contact with the panels 2 to form a unitized wall element with 6, 8, and 10 sealed against beam 22.

Figure 4B:
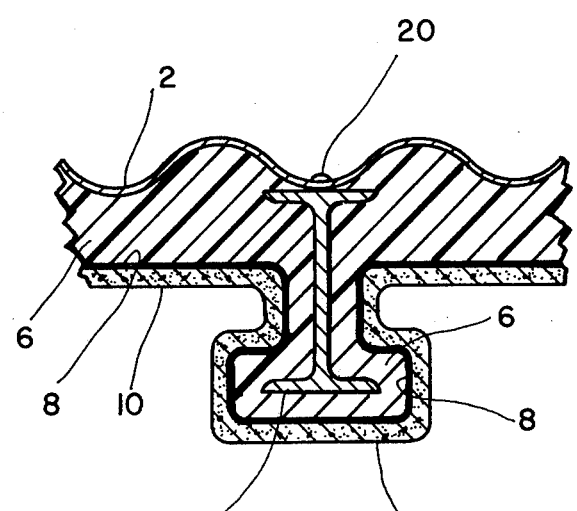

FIG. 4b shows a variation of the embodiment of FIG. 4a whereby the surface member in this embodiment includes the panels 2 and I beams 22 so that the foam layer 6, bonding agent 8, and gypsum plaster layer 10 form one continuous coat over the whole structure.

Figure 5A:
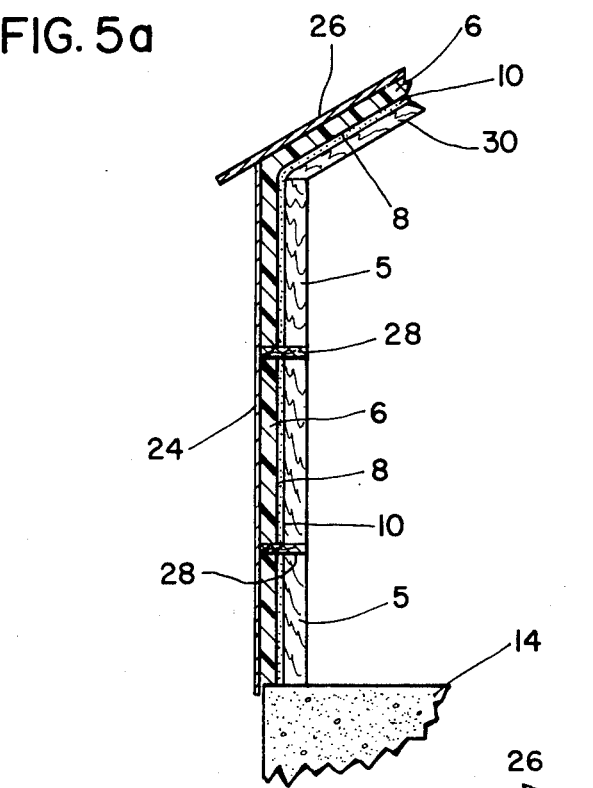
FIG. 5a is a cross-sectional view along the vertical axis of a specific embodiment showing part of a combined wall and roof section of the invention.

FIG. 5a shows a cross-sectional view of part of a combined wall and roof section. The exterior substrate member includes walls of sheet metal building panels 24 and the same material as roofing 26. The building structure is resting on a concrete slab 14. Structural elements shown include wooden studs 5, wooden girts 28, and wooden rafter 30. The foam 6, bonding agent 8, and gypsum plaster layer 10 form a continuous coating up the wall member and without interruption, on to the roof member 26.

Figure 5B:
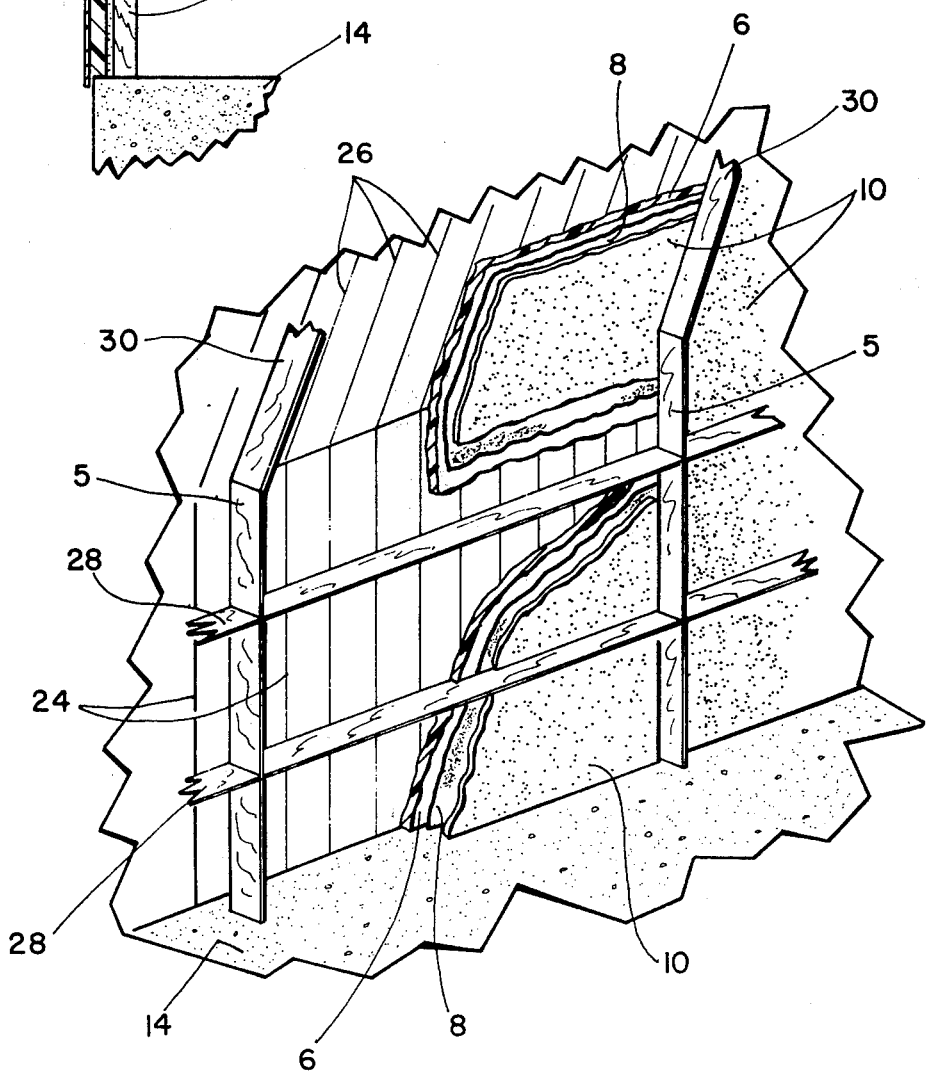
FIG. 5b is a partial cutaway perspective view of the wall and roof section of FIG. 5a but with the major portion of the foam, bonding, and plaster layers removed to illustrate better the continuity of the structural element of the invention between wall and roof.

FIG. 5b shows a partial cutaway perspective view of the embodiment shown in FIG. 5a but the major portion of the foam 6, bonding agent 8, and plaster 10 have been removed so as to better illustrate how they form the combination in sealing relationship up the wall 24 and continuing on the under side of the roof 26 without a break in the continuity. In this embodiment they are sealed up against the rafters 30, studs 5, and girts 28 rather than completely covering the walls and all structural members.

While the novel structural elements of the invention have been described with reference to certain specific embodiments thereof, it is to be clearly understood that these embodiments have been presented for purposes of illustration only and are not intended to be limiting. The scope of the invention is bounded only by the scope of the claims which are set out hereinbelow.

We claim:

1. A fire resistant insulating structural element consisting essentially of:
   a. a substrate member;
   b. a plastic foam layer one side of which is in adherent contact and coextensive with said substrate member;
   c. a swellable bonding agent layer wherein said agent is selected from the group consisting of caesin, ethylhydroxyethylcellulose, polyvinyl alcohol, aqueous emulsions of polyvinylacetate, and aqueous urea resin solutions in combination with polyvinylacetate disposed on the opposing side of said foam layer; and
   d. a face layer of different material than substrate member (a), said face layer comprising gypsum plaster in adherent contact with said bonding agent layer and coextensive with said opposing side of said foam layer.

2. A structural element according to claim 1 wherein said gypsum plaster contains a perlite aggregate and fiber glass reinforcement.

3. A fire resistant insulating structural element consiting essentially of:
   a. a substrate member;
   b. a plastic foam layer one side of which is in adherent contact and coextensive with said substrate member;
   c. a layer of polyvinylacetate bonding agent disposed on the opposing side of said foam layer; and
   d. a face layer of different material than substrate member (a) said face layer comprising fiber reinforced gypsum plaster in adherent contact with said bonding agent and coextensive with said opposing side of said foam layer.

4. A structural element according to claim 3 wherein said plastic foam layer is polyurethane.

5. A structural element according to claim 3 wherein said plastic foam layer is polyisocyanurate.

6. A structural element according to claim 3 wherein said gypsum plaster contains a perlite aggregate.

7. A structural element according to claim 3 wherein said gypsum plaster contains fiber glass reinforcement.

8. A structural element according to claim 3 wherein said substrate member is wood.

9. A structural element according to claim 3 wherein said substrate member is a sheet metal building panel.

10. A process for providing a thermal barrier for a structural element which has plastic foam disposed thereon consisting essentially of the steps of:
    a. coating said foam with a swellable bonding agent selected from the group consisting of casein, ethylhydroxyethylcellulose, polyvinyl alcohol, aqueous emulsions of polyvinylacetate, and aqueous urea resin solutions in combination with polyvinylacetate; and
    b. deposition a layer of different material than said structural element said layer comprising gypsum plaster on said bonding agent, so that said plaster is in adherent contact and coextensive with said foam.

11. A process according to claim 10 wherein said plastic foam is polyurethane.

12. A process according to claim 10 wherein said plastic foam is polyisocyanurate.

13. A process according to claim 10 wherein said bonding agent is polyvinylacetate.

14. A proces according to claim 10 wherein said gypsum plaster contains a perlite aggregate.

15. A process according to claim 10 wherein said gypsum plaster contains fiber glass reinforcement.

16. A process for the preparation of a fire resistant insulating structural element consisting essentially of the steps of:
    a. depositing a layer of a pore forming plastic on a substrate member so that said pore forming layer is coextensive with said substrate member;
    b. allowing said plastic to form a foraminous layer in adherent contact with said substrate member;
    c. coating said foraminous layer with a swellable bonding agent selected from the group consisting of casein, ethylhydroxyethylcellulose, polyvinyl alcohol, aqueous emulsions of polyvinylacetate, and aqueous urea resin solutions in combination with polyvinylacetate; and
    d. depositing a layer of different material than said substrate member said layer comprising gypsum plaster on said bonding agent so that said gypsum layer is in adherent contact and coextensive with said foraminous layer.

17. A process for the preparation of a fire resistant insulating structural element consisting essentially of the steps of:
    a. spraying a layer of a pore forming plastic on a substrate member so that said pore forming layer is coextensive with said substrate member;
    b. allowing said plastic to form a foraminous layer in adherent contact with said substrate member;
    c. spraying said foraminous layer with a polyvinylacetate bonding agent; and
    d. spraying a layer of a different material than said substrate member said layer comprising fiber reinforced gypsum plaster on said bonding agent so that said gypsum layer is in adherent contact and coextensive with said foraminous layer.

18. A process according to claim 17 wherein said foraminous layer is polyurethane.

19. A process according to claim 17 wherein said foraminous layer is polyisocyanurate.

20. A process according to claim 17 wherein said gypsum plaster contains a perlite aggregate.

21. A process according to claim 17 wherein said gypsum plaster contains fiber glass reinforcement.

22. A process according to claim 17 wherein said substrate member is wood.

23. A process according to claim 17 wherein said substrate member is a sheet metal building panel.

* * * * *